United States Patent [19]
Byrley

[11] Patent Number: 5,962,831
[45] Date of Patent: Oct. 5, 1999

[54] ELECTRONIC MARKETING APPARATUS AND METHOD

[75] Inventor: Frank D. Byrley, Dallas, Tex.

[73] Assignee: Retail Services, Inc., Dallas, Tex.

[21] Appl. No.: 07/933,960

[22] Filed: Aug. 21, 1992

Related U.S. Application Data

[63] Continuation of application No. 07/488,144, Mar. 5, 1990, abandoned.

[51] Int. Cl.[6] ........................................ G06K 5/00
[52] U.S. Cl. ............................ 235/380; 902/27; 235/379
[58] Field of Search .................................. 235/449, 379, 235/380, 381, 382; 902/27; 364/408

[56] References Cited

U.S. PATENT DOCUMENTS

| | | | |
|---|---|---|---|
| 3,594,727 | 7/1971 | Braun | 902/27 |
| 4,641,239 | 2/1987 | Takesako | 902/27 |
| 4,650,978 | 3/1987 | Hudson et al. | 235/380 |
| 4,882,473 | 11/1989 | Bergeron | 235/492 |

*Primary Examiner*—Harold I. Pitts
*Attorney, Agent, or Firm*—Timmons & Kelly

[57] ABSTRACT

An apparatus for processing consumer transactions and recording them on a consumer's magnetic stripe card is disclosed, having a magnetic stripe reader, a magnetic stripe encoder, a printer and an account processing station. In one arrangement, a plurality of such apparatus are operatively connected to a master accounting station through an automatic communication system. A method for processing consumer transactions and a method for producing a promotional game are also disclosed.

14 Claims, 1 Drawing Sheet

ELECTRONIC MARKETING APPARATUS AND METHOD

This application is a continuation of application Ser. No. 07/488,144, filed Mar. 5, 1990 now abandoned.

TECHNICAL FIELD

The present invention relates generally to electronic marketing systems for retail stores and to methods of tracking consumer transactions.

In marketing retail sales, a common strategy is to encourage people to become regular customers by rewarding those consumers who make frequent transactions. Examples of such marketing would be frequent flyer programs for airlines and savings stamps given for purchases. Some retailers have promoted consumer games, often based on chance in order to encourage frequent buying. The desire to provide some kind of instant reward or at least instant feedback to consumers has led to the use of "Instant Win" games which let a purchaser know immediately what he or she will win or at least when he or she will win.

A customer data base for a retail store is generally segmented by purchases or visits. The system must capture every customer transaction and sort out the frequent user transactions in order to have a frequent user promotion in order to include records of "points" accumulated on customer statements, greatly increasing data processing and communications costs. The points accumulated by consumers can then be redeemed for prizes.

BACKGROUND ART

A number of systems exist for processing information obtained from magnetic stripe cards. An automatic teller machine reads identification information from a magnetic stripe card and transmits the information to a master accounting station along with a password punched in on a key pad by the customer. The master accounting station processes the identification information and password by checking them against a master list. If the identification information and the password are in agreement, then the master accounting station transmits a message to the automatic teller machine which allows the customer to enter a transaction request. The teller machine then transmits the information regarding the request to the master accounting station which checks the account of the person or company identified on the card. If the account permits the requested transaction, then the master accounting station transmits predetermined information to the teller machine, and if the account does not permit the requested transaction, then the master accounting station transmits different predetermined information. Normally, an automatic teller machine also includes a printer which prints out receipts for transactions and messages regarding account inquiries.

Another system which makes use of the information encoded onto magnetic stripe cards is the credit verification system. One such system is shown in U.S. Pat. No. 3,696,335 of Lemelson et al. That credit card verification system includes a master accounting station with recording means for recording and updating information with respect to specific accounts and a plurality of account verification stations. The account verification stations read the account-identifying information from a magnetic stripe card. An automatic communication system allows the automatic transmission of information from the master accounting station to the plurality of account verification stations. The automatic communication system shown is for one way communication from the master accounting station to the account verification stations, but later systems allow for two way transmission.

DISCLOSURE OF INVENTION

The present invention differs from other systems known to the inventor in that it both reads from and writes to the magnetic stripe cards, and it uses the cards for keeping account information. The system includes a master accounting station, a plurality of account processing stations, a plurality of magnetic stripe readers associated with the account processing stations and a plurality of magnetic stripe encoders associated with the account processing stations. An automatic communication system is operable for the automatic transmission of information from the plurality of account processing stations to the master accounting station as well as in the other direction. A preferred form of the system also includes a plurality of printers associated with the account processing stations for printing messages to customers. In a preferred arrangement, the card readers and encoders operate for high energy magnetic stripe cards. A high energy card creates a magnetic field which is typically near 2700 oersted, preferably in range of from 2600 to 2800 oersted or at least from 2000 to 3500 oersted. One arrangement of the account processing station includes a key pad to be operated by store personnel to enter current transactions.

A method according to the present invention includes the steps of storing information to be processed on a magnetic stripe card, reading the information from the card and then storing the processed information back onto the card. The step of entering information about current transactions from a key pad can be added prior processing the information. A promotional game according to the present invention also includes a step of indicating to the consumer if the information before or after processing a predetermined condition corresponding to winning a prize or proceeding to the next level of the game.

These and other objects, advantages and features of this invention will be apparent from the following description taken with reference to the accompanying drawing, wherein is shown a preferred embodiment of the invention.

BEST MODE FOR CARRYING OUT THE INVENTION

Figure 1:
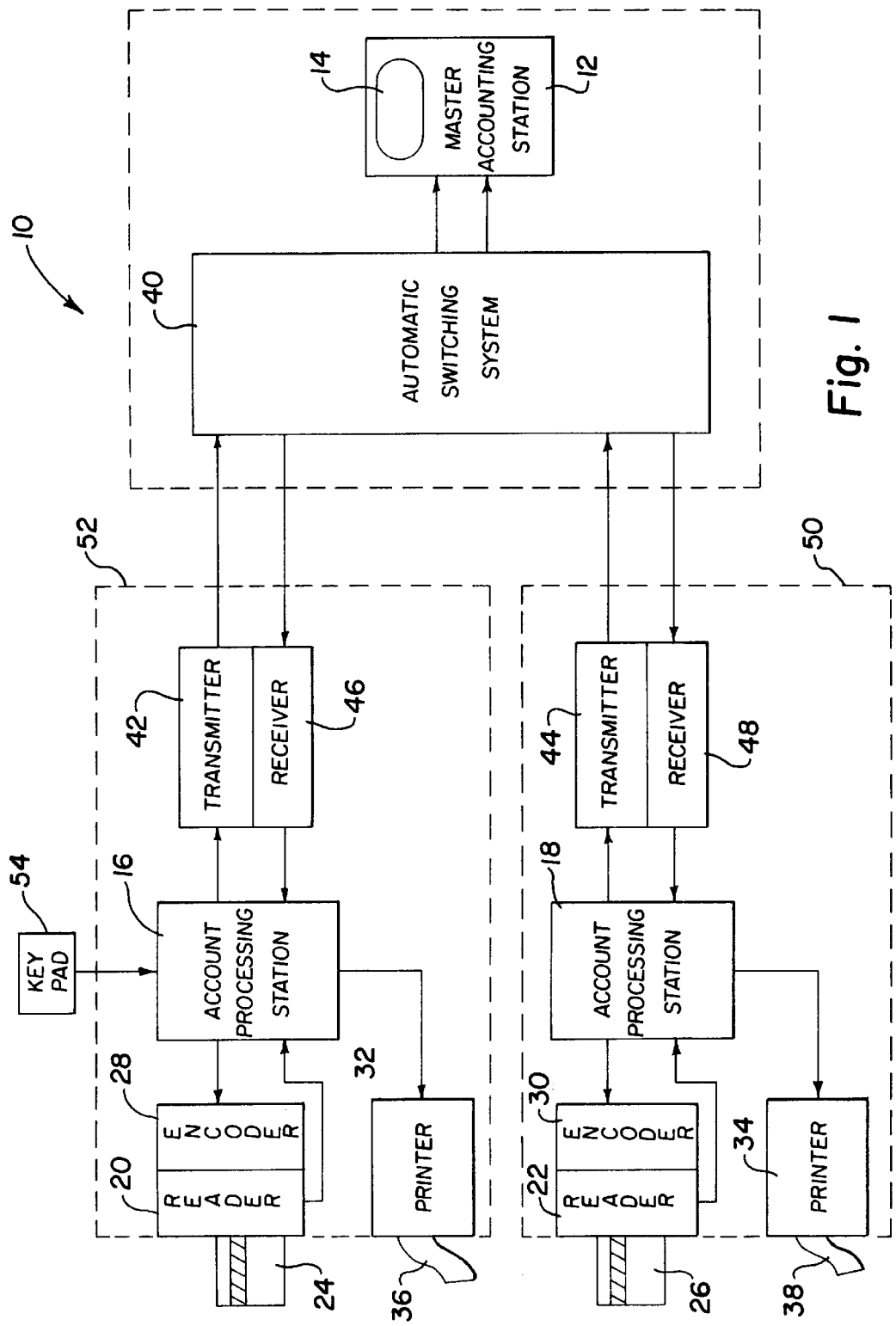
FIG. 1 is a block diagram representation of a system for processing selected transactions according to the present invention.

Referring now to the drawing, a system according to the present invention for processing selected transactions is referred to generally by reference numeral 10. System 10 includes a master accounting station 12 with a recording means 14 such as a magnetic disc or tape for recording and updating information with respect to specific accounts and a plurality of account processing stations 16 and 18 which would be at sites near where the transactions take place such as in retail stores near the checkout counters. A plurality of magnetic stripe readers 20 and 22 are capable of reading information encoded onto a plurality of magnetic stripe cards 24 and 26. At least one of the magnetic stripe readers 20 and 22 is operatively connected to each of the plurality of account processing stations 16 and 18 respectively. A plurality of magnetic stripe encoders 28 and 30 capable of encoding information onto plurality of cards 24 and 26 are operatively connected to account processing stations 16 and 18 respectively. One arrangement of the present invention takes advantage of high energy magnetic stripe cards. In such an arrangement, the card creates a magnetic field which is typically near 2700 oersted, preferably in the range of from 2600 to 2800 oersted or at least from about 2000 to about 3500 oersted. Taking advantage of the higher magnetic field would offer several advantages, but with the present invention, even low magnetic field cards, typically around 300 oersted, can be used. This may be necessary since many retailers will specify low energy units in order to be compatible with existing cards which are virtually all low energy. With the present system, every time a customer uses the apparatus, the encoder can "freshen" all data stored on a low energy card, even rewriting customer identification information. Such a system could even periodically change customer information for security purposes.

A plurality of printers 32 and 34 capable of printing human readable messages onto a tangible medium of expression such as paper 36 and 38 are operatively connected to each of the account processing stations, stations 16 and 18 respectively. A printed receipt is used to award prizes or premiums earned or won. It can also be a complete statement of total cardholder activity issued with each card use, eliminating the very expensive processing and mailing of periodic status statements to cardholders.

An automatic switching system 40 is operable for the automatic transmission of information from the plurality of account processing stations to master accounting station 12 and from master accounting station 12 to plurality of account processing stations 16 and 18. In the arrangement shown, the transmission is through transmitters 42 and 44 and receivers 46 and 48. Account processing station 16 transmits information read from magnetic stripe card 24 to master accounting station 12 if that information meets a first predetermined condition. A typical first predetermined condition might be that the card has accumulated a certain threshold number of transactions without having been uploaded to the master accounting station or that the information on the card has not been uploaded for so many weeks or months. The master accounting station can also make a determination if the customer has won a certain category of prize, one associated with being a regular and frequent buyer.

It is thus easy to see that when a customer comes up to a self serve machine such as apparatus 50 and inserts his or her card 26, the card already having information stored on it about previous transactions and new transactions, reader 22 reads the card and sends the information to account processing station 18. Account processing station 18 checks the information received from reader 22 in order to determine if the information needs to be uploaded to master accounting station 12 or if it meets a criteria for an instant win. If the information meets the criteria for an instant win, then account processing station 18 transmits a message to printer 34 for printing out to the customer indicating that the information met the predetermined condition.

If account processing station 18 had determined that the information should be uploaded to master accounting station 12, then it would send information to encoder 30 to encode onto card 26 that the information as of that date and time had been uploaded. One way of doing this would be to simply write zeros or other appropriate code onto the card.

Apparatus 52 is for use by store personnel and includes a key pad 54 for entering information about current transactions. That information would then be included with the information stored on the card unless it is uploaded.

Apparatus 50 and 52 can also act as stand alone units. An entire cardholder transaction data base can be maintained permanently and exclusively on the card's magnetic stripe. Only if the retailer desires a central card holder data base would this card data base be uploaded to a master accounting station. This decision can be made and implemented at any point during the life of the program.

It is now easy to see that the present system allows information about transactions to be temporarily stored on the customer's own card. It allows instant win games that are not based on chance and which do not require the posting of odds or the publishing of rules. It also allows the relatively easy maintenance of a data base segmented by purchasers. It is easy with the present invention to identify purchasers who make frequent purchases. Data processing and communications costs are greatly reduced.

A system according to the present invention could have numerous other applications:

time and attendance;

positive activity file check authorization. Check cashing activity is actually encoded onto The card. Good check writers can be identified and rewarded with expanded services. Competitive systems use negative files to identify high risk checks but do not identify low or no risk checks;

off-line credit card processing. This is especially applicable for high volume low dollar transaction retailers. The first card use would be preauthorized with the card user. Purchases below a floor limit would be automatically approved until a pre-established level is reached which triggers another authorization against a negative file or the card user;

debit card;

traditional credit card processing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in limiting sense.

I claim:

1. A system for processing selected transactions, comprising in combination:

a master accounting station including recording means for recording and updating information with respect to specific accounts;

a plurality of account processing stations;

a plurality of magnetic stripe cards, wherein one or more cards represents an account;

a plurality of magnetic stripe readers capable of reading information encoded on the plurality of magnetic stripe cards, with at least one of the magnetic stripe readers operatively connected to each of the plurality of account processing stations;

a plurality of magnetic stripe encoders capable of encoding information onto the plurality of magnetic stripe cards, with at least one of the magnetic stripe encoders operatively connected to each of the plurality of account processing stations;

wherein each of the plurality of account processing stations receives information from its respective at least one reader and sends processed information to its respective at least one encoder; and an automatic communication system operable for the automatic transmission of information from the plurality of account processing stations to the master accounting station, wherein an account processing station transmits information read from a magnetic stripe card to the master accounting station if that information meets a first predetermined condition regarding transactions since transaction information was last transferred to the master accounting station, and wherein any transaction is processed entirely off-line from the master accounting station if that information does not meet the first predetermined condition, and the result of the transaction is encoded onto the magnetic stripe card by the associated at least one magnetic stripe encoder.

2. A system according to claim 1 further comprising a tangible medium of expression and a plurality of printers capable of printing human readable messages onto the tangible medium, with at least one of the printers operatively connected to each of the plurality of account processing stations, wherein the account processing station transmits a message to its respective printer for printing of a human readable message onto the tangible medium if information read from the magnetic stripe card meets a second predetermined condition.

3. A system according to claim 2 wherein the automatic communication system is also operable for the automatic transmission of information from the master accounting station to the plurality of account processing stations and wherein the account processing station transmits a message to its respective printer for printing of a human readable message onto the tangible medium in response to the transmission of certain information from the master accounting station regarding status of a card or account with respect to the receipt of a prize or premium.

4. A system according to claim 1 wherein the automatic communication system is also operable for the automatic transmission of information from the master accounting station to the plurality of account processing stations and wherein the account processing station sends information to its respective magnetic stripe encoder for encoding onto the magnetic stripe card in response to the transmission of certain information from the master accounting station.

5. A system according to claim 4 wherein the magnetic stripe card creates a magnetic field of between 2000 and 3500 oersted.

6. A system according to claim 4 wherein the magnetic stripe card creates a magnetic field of between 2600 and 2800 oersted.

7. A method for processing consumer transaction information, comprising in combination the steps of:

storing the information to be processed on a card suitable for storing information regarding a particular consumer and suitable for being easily carried by the consumer;

reading the information from the card;

processing locally the information which has been read from the card;

automatically communicating the information from the card for further processing remotely if the information meets a first predetermined condition regarding transactions since transaction information was last communicated for further processing processing any transaction requested by the consumer entirely locally if that information does not meet the first predetermined condition; and storing the processed information onto the card.

8. A method for producing a promotional game based upon information about transactions of a consumer, comprising in combination the steps of:

storing information about previous transactions on a card suitable for storing information regarding a particular consumer and suitable for being easily carried by the consumer;

adding information about each new transaction of the consumer to the information already stored on the card;

reading the original information and the information about any new transactions from the card;

processing locally the original information and the information about any new transactions;

automatically communicating the information from the card for further processing remotely if the information meets a first predetermined condition regarding transactions since transaction information was last communicated for further processing;

processing any transaction requested by the consumer entirely locally if that information does not meet the first predetermined condition; and indicating to the consumer if the processed information meets a second predetermined condition regarding status of the consumer with respect to the receipt of a prize or premium.

9. A system for processing selected transactions, comprising in combination:

a master accounting station including recording means for recording and updating information with respect to specific accounts;

a plurality of account processing stations;

a plurality of cards suitable for storing information, wherein one or more cards represents an account;

a plurality of readers capable of reading information encoded on the plurality of cards suitable for storing information, with at least one of the readers operatively connected to each of the plurality of account processing stations;

a plurality of encoders capable of encoding information onto the plurality of cards suitable for storing information, with at least one of the encoders operatively connected to each of the plurality of account processing stations;

wherein each of the plurality of account processing stations receives information from its respective at least one reader and sends processed information to its respective at least one encoder; and an automatic communication system operable for the automatic transmission of information from the plurality of account processing stations to the master accounting station, wherein an account processing station transmits information read from a card suitable for storing information to the master accounting station if that information meets a first predetermined condition regarding transactions since transaction information was last transferred to the master accounting station, and wherein any transaction is processed entirely off-line from the master accounting station if that information does not meet the first predetermined condition, and the result of the transaction is encoded onto the card suitable for storing information by the associated at least one encoder.

10. A system according to claim 9 further comprising a tangible medium of expression and a plurality of printers capable of printing human readable messages onto the tangible medium, with at least one of the printers operatively connected to each of the plurality of account processing stations, wherein the account processing station transmits a message to its respective printer for printing of a human readable message onto the tangible medium if information read from the card suitable for storing information meets a second predetermined condition.

11. A system according to claim 10 wherein the automatic communication system is also operable for the automatic transmission of information from the master accounting station to the plurality of account processing stations and wherein the account processing station transmits a message to its respective printer for printing of a human readable message onto the tangible medium in response to the transmission of certain information from the master accounting station regarding status of a card or account with respect to the receipt of a prize or premium.

12. A system according to claim 9 wherein the automatic communication system is also operable for the automatic transmission of information from the master accounting station to the plurality of account processing stations and wherein the account processing station sends information to its respective encoder for encoding onto the card suitable for storing information in response to the transmission of certain information from the master accounting station.

13. A method for processing consumer transaction information, comprising in combination the steps of:

storing the information to be processed regarding a particular consumer on a magnetic stripe card suitable for being easily carried by the consumer;

reading the information from the card;

processing locally the information which has been read from the card;

automatically communicating the information from the card for further processing remotely if the information meets a first predetermined condition regarding transactions since transaction information was last communicated for further processing;

processing any transaction requested by the consumer entirely locally if that information does not meet the first predetermined condition; and storing the processed information onto the card.

14. A method for producing a promotional game based upon information about transactions of a consumer, comprising in combination the steps of:

storing information about previous transactions regarding a particular consumer on a magnetic stripe card suitable for being easily carried by the consumer, adding information about each new transaction of the consumer to the information already stored on the card;

reading the original information and the information about any new transactions from the card;

processing locally the original information and the information about any new transactions;

automatically communicating the information from the card for further processing remotely if the information meets a first predetermined condition regarding transactions since transaction information was last communicated for further processing;

processing any transaction requested by the consumer entirely locally if that information does not meet the first predetermined condition; and indicating to the consumer if the processed information meets a second predetermined condition regarding status of the consumer with respect to the receipt of a prize or premium.

* * * * *